United States Patent [19]

Deacon

[11] Patent Number: 4,999,839

[45] Date of Patent: Mar. 12, 1991

[54] AMPLIFIER-OSCILLATOR FREE ELECTRON LASER

[75] Inventor: David A. G. Deacon, Los Altos, Calif.

[73] Assignee: Deacon Research, Palo Alto, Calif.

[21] Appl. No.: 375,430

[22] Filed: Jul. 3, 1989

[51] Int. Cl.[5] .......... H01S 3/00

[52] U.S. Cl. .......... 372/2; 372/25; 315/5

[58] Field of Search .......... 372/2, 25; 315/5

[56] References Cited

U.S. PATENT DOCUMENTS 4,740,973 4/1988 Madey et al. .......... 372/2
4,779,277 10/1988 Gorer et al. .......... 372/2
4,835,446 5/1989 Nation et al. .......... 315/5

OTHER PUBLICATIONS

A. Bhowmik, et al., "Design Concept for a Common RF Accelerator Driven Free Electron Laser Master Oscillator/Power Amplifier", Nucl. Instr. & Meth., A272 (1988) 183–186.

S. V. Benson, et al., "Status Report on the Stanford Mark III IR FEL", Nucl. Instr. & Meth., A272 (1988) 22–28.

A. Bhowmik, et al., "First Operation of the Rocketdyne/Stanford FEL", Nucl. Instr. & Meth., (1988) 10–14.

W. B. Colson, et al., "Angular Gain Spectrum of Free Electron Lasers", Phys. Rev. A31, (1985) 828–842.

J. E. Sollid, et al., "Sideband Suppression in the Los Alamos FEL Using a Littrow Grating", Report LA-UR-88-3655, LANL P.O. Box 1663 MS J579, Los Alamos, N.M. 87545 (to be published in the proceedings of the 10th annual FEL conference, Jerusalem, 1988).

*Primary Examiner*—Léon Scott, Jr.

*Attorney, Agent, or Firm*—Kenneth R. Allen; David N. Slone

[57] ABSTRACT

Apparatus and method are provided for causing different groups of particles from an accelerated electron or positron beam to interact exclusively in different sections of a free electron laser. The sections may be one or several amplifiers and an oscillator. The electron beam of a single accelerator used to excite a free electron laser is directed to traverse first an amplifier section or a sequence of amplifier sections and thereafter is directed into an oscillator section where the electron beam induces lasing. If the beam source is pulsed, this invention produces the proper time synchronization of electron and laser pulses. Specifically, delay times between optical pulses are employed among the oscillator and the amplifier or amplifiers to cause the laser to oscillate on the appropriate subharmonic or subharmonics of the accelerator repetition rate so that the intervening electron pulses are used only in the amplifier or amplifiers.

13 Claims, 6 Drawing Sheets

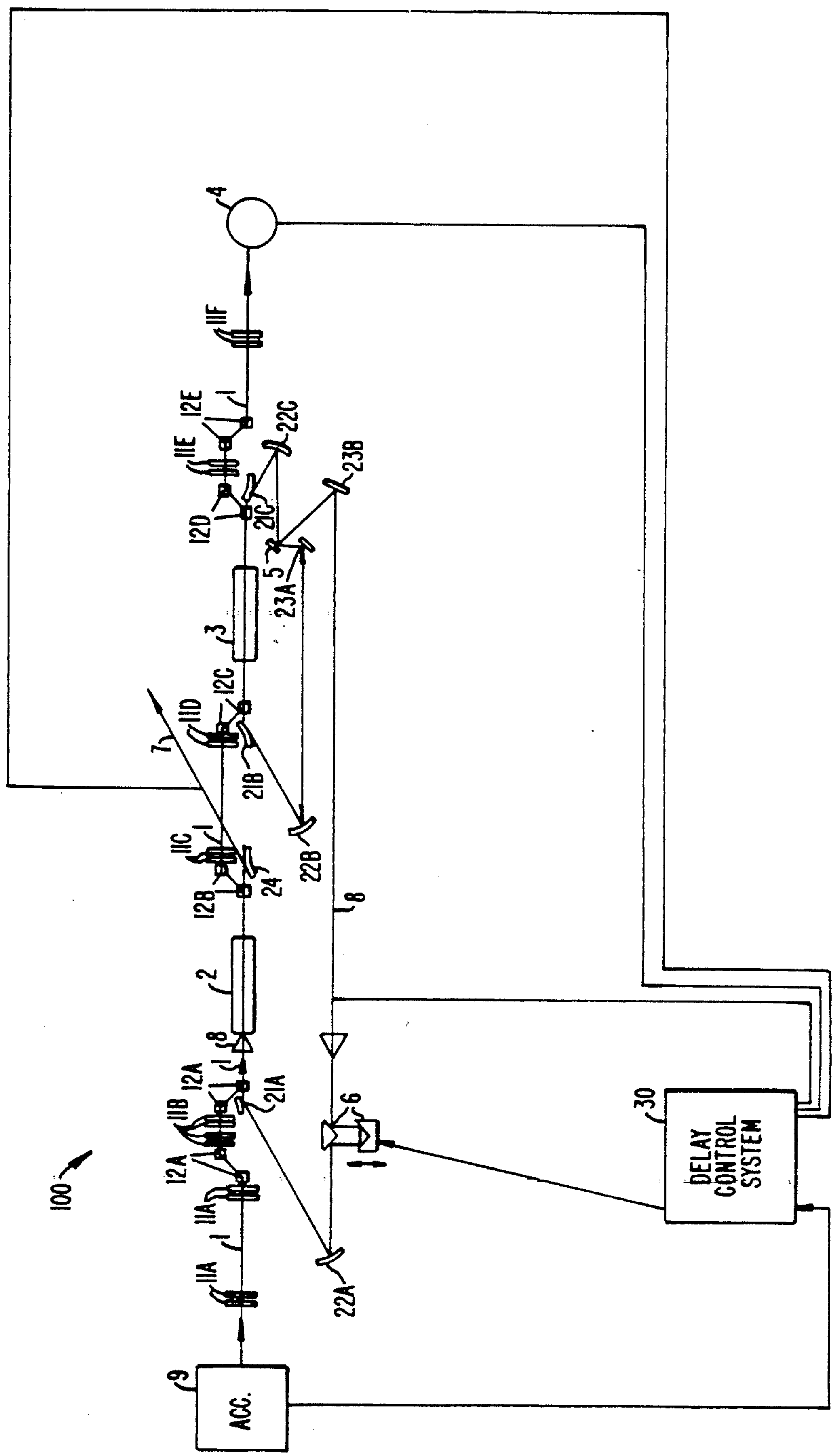
FIG._1.

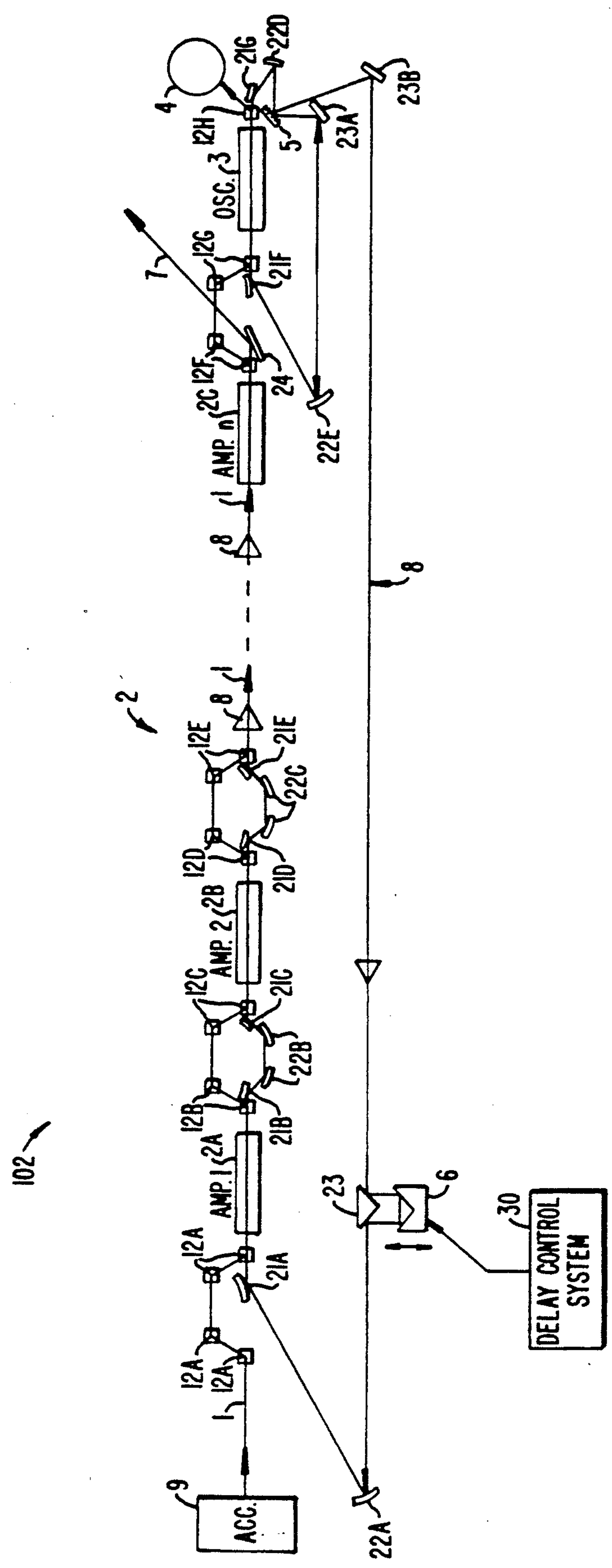
FIG._2.

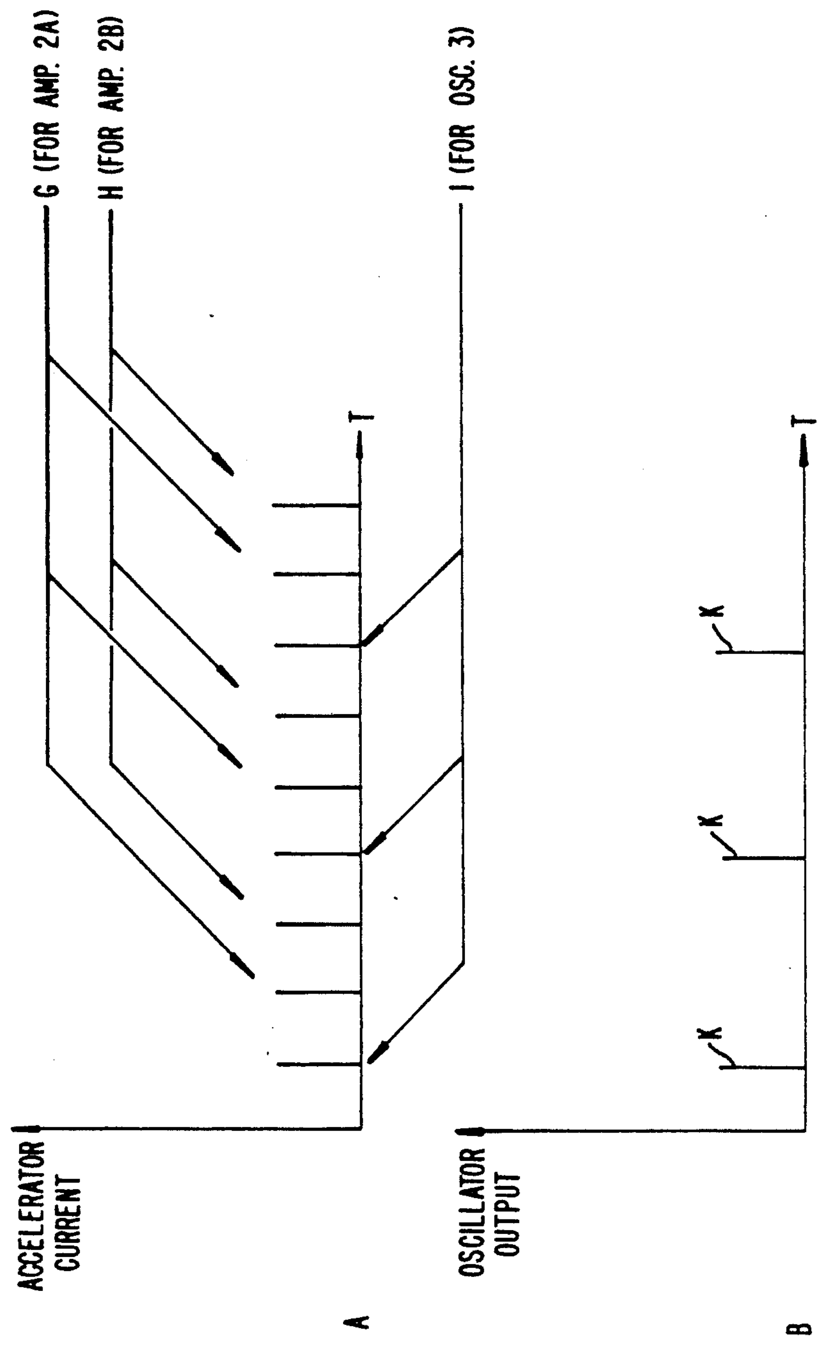
FIG._3.

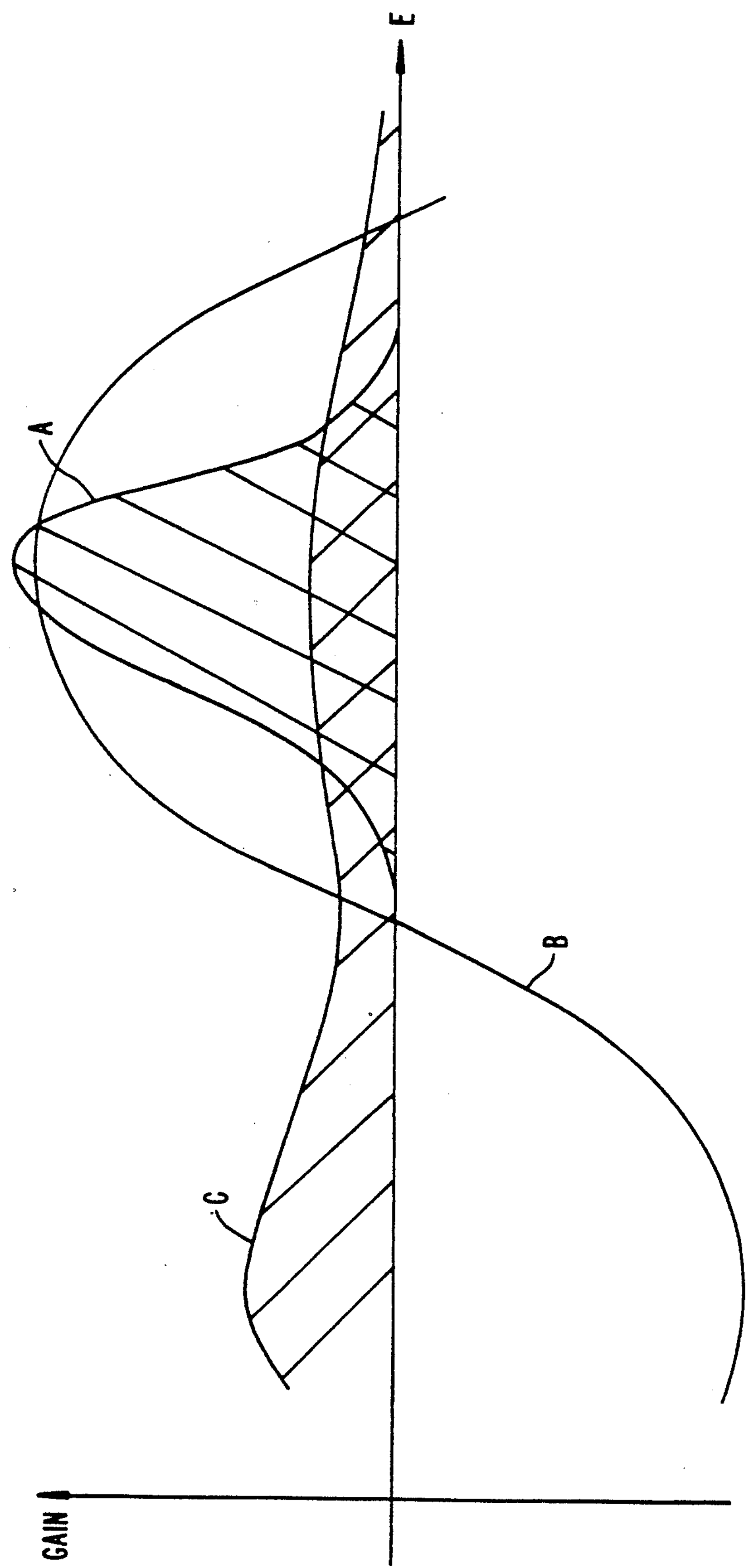
FIG._4.

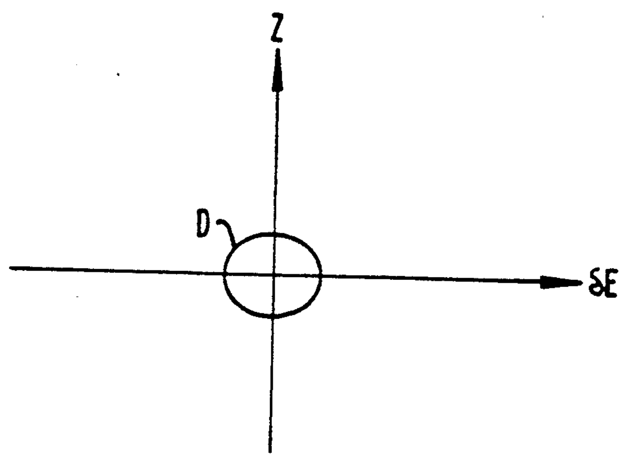
FIG._5A.
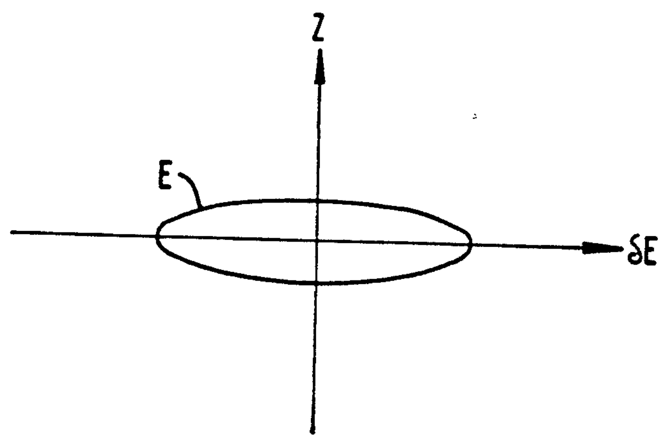
FIG._5B.
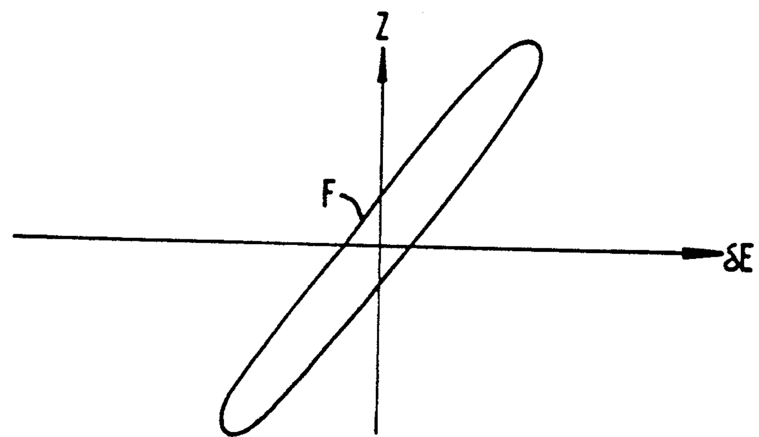
FIG._5C.

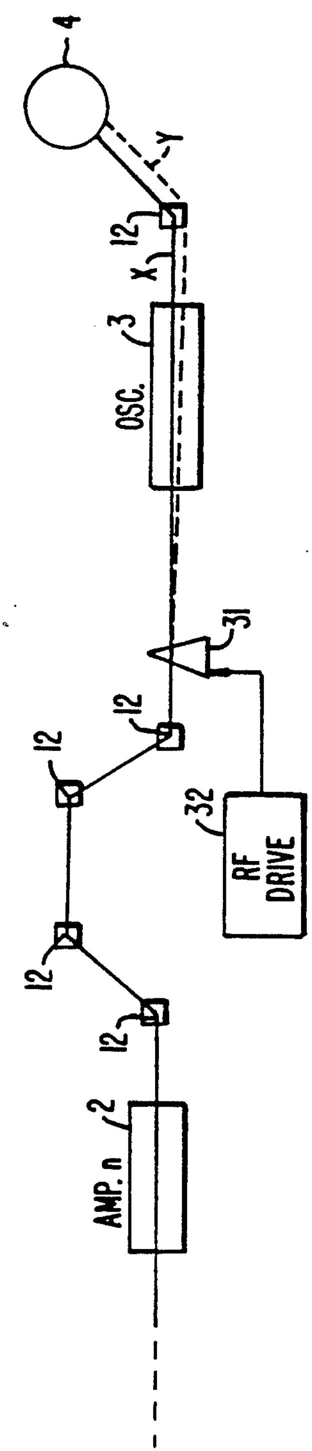
FIG._6.

AMPLIFIER-OSCILLATOR FREE ELECTRON LASER

CROSS REFERENCE TO RELATED DOCUMENTS

This application is based on Disclosure Document No. 167880 filed in the United States Patent and Trademark Office on Apr. 3, 1987. This disclosure document is incorporated herein by reference and made a part hereof.

BACKGROUND OF THE INVENTION

This invention relates to the optimal configuration of the oscillator section and the amplifier sections of free electron or free positron generators of electromagnetic radiation, generally known as free electron lasers (FELs).

Many commercial applications of free electron lasers will require a high peak or average output power. Since the output coupling fraction of oscillators is typically low, the oscillator module of an FEL generates a higher-power intracavity optical beam than can be extracted. Furthermore, the design of oscillators is constrained by the requirement that the intracavity power not exceed the damage threshold of the resonator mirrors. For both of these reasons, a considerable amount of effort has gone into designing and testing FELs which include amplifier sections. In the amplifier, the optical beam which is outcoupled from the oscillator is amplified to high power levels. In contrast to the oscillator case, all of the output from the amplifier is available for the applications, and since the requirement for feedback does not apply to the amplifier, the mirrors may be placed a large distance away, reducing the power density below the damage threshold. This configuration is called the master oscillator-power amplifier (MOPA) configuration.

The first (and only) experimental test of the MOPA configuration was run in a collaborative effort between Stanford and Rocketdyne in the fall of 1988. A design study for the use of the MOPA configuration in the FEL was published in 1988 by A. Bhowmik, et al., "*Design concept for a common RF accelerator driven free electron laser master oscillator/power amplifier*", Nucl. Instr. & Meth., A272 (1988) 183–186. The experiment used the Mark III accelerator, a Stanford oscillator constructed in 1985 (as described by S.V. Benson, et al. "*Status report on the Stanford Mark III IR FEL*", Nucl. Instr. & Meth., A272 (1988) 22–28), and a Rocketdyne wiggler constructed in 1987 (as described by A. Bhowmik, et al., "*First operation of the Rocketdyne/Stanford FEL*", Nucl. Instr. & Meth., A272 (1988) 10–14), which was used as the amplifier. This experiment suffered from a problem caused by the fact that the electron beam passed through the oscillator before it entered the amplifier. This problem comes from the fact that the energy spread of the electron beam is increased by the free electron laser interaction. The gain of the amplifier is reduced by this additional energy spread. This effect was recognized in the design of the MOPA experiments, but action could not be taken to remedy this effect. As a result, data could only be taken with very low oscillator power so that the perturbation of the electron beam energy spread by the oscillator was negligible. The required time gating on the measurement electronics was difficult and complex, and the output power of the amplifier was considerably.

Two alternatives have been proposed in A. Bhowmik, et al., A272 (1988) 183–186, above to solve this problem. The first proposal is to chop up the electron beam with an RF device which would separate alternate micropulses into separate beamlines, one going into the oscillator and the other bypassing the oscillator and leading directly to the amplifier. This is a costly approach which requires a high power RF beam chopper and control electronics, as well as a duplicate beamline to bypass the oscillator.

The second proposal is to add an intracavity optical element to the oscillator which would shut off the oscillator at certain times so that the electron pulses desired to pass through to the amplifier unperturbed would never overlap with laser pulses in the oscillator. This second proposal, although much cheaper than the first, suffers from the grave difficulty that it requires the intracavity use of optically active materials which have significantly lower damage thresholds than the resonator mirrors. This option therefore requires lowering the output power of the oscillator, which in the MOPA configuration would require the use of a higher amplifier gain to obtain the same output power.

What is needed is a method and an apparatus for providing power amplification for a free electron laser which is less costly and more effective than heretofore proposed.

SUMMARY OF THE INVENTION

According to the invention, apparatus and method are provided for causing different groups of particles from an accelerated electron or positron beam to interact exclusively in different sections of a free electron laser. The sections may be one or several amplifiers and an oscillator. The electron beam of a single accelerator used to excite a free electron laser is directed to traverse first an amplifier section or a sequence of amplifier sections and thereafter is directed into an oscillator section where the electron beam induces lasing. If the beam source is pulsed, this invention produces the proper time synchronization of electron and laser pulses. Specifically, delay times between optical and electron pulses are employed among the oscillator and the amplifier or amplifiers to cause the laser to oscillate on the appropriate subharmonic or subharmonics of the accelerator repetition rate so that the intervening electron pulses are used only in the amplifier or amplifiers.

The invention automatically provides for synchronization of a subset of the accelerator micropulses with the optical pulses in the oscillator, while at the same time synchronizing the remainder of the micropulses with the optical pulses in the amplifier is accomplished by routing the electron beam first through the amplifier and then through the oscillator. This configuration is hereafter designated the power amplifier-master oscillator (PAMO) configuration.

The invention provides a simple and low cost configuration which allows FEL beam amplification using a single accelerator and minimal additional equipment. It provides a system which synchronizes itself automatically and is compatible with the use of multiple amplifier sections, each of which uses an independent set of accelerator micropulses.

In the present invention, where the electron beam from a single accelerator is passed first through the amplifier or amplifiers, and finally through the oscillator, optics are provided to permit the buildup and saturation of the laser intensity within the oscillator, to outcouple a fraction of the oscillator power, and to appropriately direct, delay, and refocus this power through the amplifier section or sections. As a result, the electrons pass first through the amplifier portion and thereafter the oscillator, while the photons originate in the oscillator and then pass through the amplifier. This configuration allows the system to synchronize itself if the components are properly arranged.

The present invention allows an FEL to make optimum use of the accelerator beam without adding costly RF switching or damage-prone intracavity elements. The oscillator/amplifier FEL would also work with a system which dedicates two or more accelerators to the task, one for the oscillator, and one (or more) for the amplifier(s). However, the high cost of the multiple-accelerator approach rules it out for all but the highest average power applications.

The present invention offers several specific advantages over the prior art. By synchronizing the use of subharmonic pulse trains between oscillator and amplifier, the interference problem in the MOPA configuration is solved where the oscillator otherwise tends to destroy the quality of the electron beam which enters the amplifier section. As distinct from the alternatives which have been offered to date, the present PAMO configuration requires no additional equipment such as intracavity optical switches. The oscillator-amplifier interference problem is solved by the simple expedient of reversing the order of the oscillator and amplifier sections. No further effort is required to set up the present PAMO configuration than is required for the MOPA. All of the fine delay adjustments and fine alignment adjustments must also be present for the MOPA. The division of utilization of the electron pulses between oscillator and amplifier occurs automatically once the timing has been properly set up. By taking advantage of the multiple timing options, a flexible time structure can be obtained at the output.

A clearer understanding of the invention will be had with reference to the following description and the accompanying drawings.

BRIEF DESCRIPTION OF THE DRAWINGS

FIG. 1 is a schematic diagram of a first embodiment of the invention including a single amplifier;

FIG. 2 is a schematic diagram of a second embodiment of the invention including multiple amplifiers;

FIG. 3 is a timing diagram of the electron current and optical output waveforms;

FIG. 4 is a diagram of the dependence of the FEL gain on the energy spread of the input electrons;

FIG. 5A is a first diagram of the dependence of the electron micropulse bunch length on the energy spread of the electrons;

FIG. 5B is a second diagram of the dependence of the electron micropulse bunch length on the energy spread of the electrons;

FIG. 5C is a third diagram of the dependence of the electron micropulse bunch length on the energy spread of the electrons;

FIG. 6 is a schematic diagram of the deflector system for additional gain suppression in the oscillator.

DESCRIPTION OF THE PREFERRED EMBODIMENTS

FIG. 1 illustrates a first embodiment of a free electron laser 100 in accordance with the invention. A source of free electrons or equivalent, such as an accelerator 9, is disposed to direct an electron beam 1 in focus into a free electron amplifier 2 and thereafter through an oscillator 3. Optical laser energy first induced in the oscillator 3 is directed in a beam 8 back through the amplifier 2 where it is further amplified by free electrons different than those used to induce oscillation.

The free electron amplifier 2 comprises an evacuated tube (for transport of the electron and photon beams), a wiggler (not shown) through which the tube passes, and appropriate diagnostic elements (not shown). A wiggler is a means for producing a spatially reciprocating magnetic field, that is, a magnetic field which is reversed frequently along a beam path. The magnetic field is established by either permanent magnets or electromagnets.

That portion of the optical beam propagating in the amplifier 2 which overlaps with the electron beam is amplified, provided that the wavelength, energy, and magnetic field of the wiggler are properly related, as is well known in the art. (See for example, W.B. Colson et al., "*Angular gain spectrum of free electron lasers*", Phys. Rev. A31, (1985) 828–842.)

The final optical injection element before the amplifier 2 is a convex reflector 21A which must be placed on axis. The electron beam 1 is directed around the injection optic 21A using a series of deflection magnets 12A (and other associated beam elements such as quadrupoles 11A and 11B and beam positioning diagnostic elements). The magnets 12A, 12B, 12C, 12D, 12E can also be used for fine steering adjustment so that the electron beam 1 is aligned to the appropriate angle with the optical beam 8 in the amplifier 2 and the oscillator 3. The alignment is usually coaxial.

The electron beam 1 is preferably focussed into the amplifier 2 for optimum gain. The quadrupoles 11A and 11B upstream of the amplifier 2 provide the focussing function. Both the electron beam 1 and the optical beam 8 are typically focussed to a waist at the center of the amplifier 2, with waist sizes such as to optimize the gain.

The exact number and placement of the magnetic elements 11A, 11B can vary depending on the type of electron transport desired.

An extraction optic 24 is provided to draw off finally-amplified optical energy as an output beam 7. The electron beam 1 emerging from the amplifier 2 is deflected around the extraction optic 24 and an oscillator injection optic 21B. The electron beam is injected into the oscillator section 3. The fine alignment of the electron beam 1 coaxial with the oscillator mode in the oscillator section 3 is accomplished with bending magnets 12B and 12C between the amplifier section 2 and the oscillator section 3. Focussing is provided for the electron beam 1 so that the waist of the electron beam 1 is located at the center of the oscillator section 3 with an appropriate waist size.

After passage through the oscillator section 3, the electron beam 1 is deflected around the convex extraction reflector 21C via bending magnets 12D and 12E and directed into the remaining sections 4 of the accelerator, which might be a beam dump, recirculation optics, or an energy recovery system.

The optical beam 8 is generated in the oscillator section 3. The oscillator optical design can be one of many types, ranging from the simple two-mirror resonator to more complicated multiple-element resonators. In FIG. 3, a ring resonator configuration is illustrated with beam expansion optics. This configuration is known to handle a high peak and average power density. Output coupling schemes can also vary through many possibilities, including transmission through a resonator mirror, diffraction from an annular mirror, diffraction from a grating, reflection from polarization dependent coatings, and others. Diffraction from a grating 5 is shown. It has the advantage of sideband suppression, as taught by J.E. Sollid et al. ("Sideband suppression in the Los Alamos FEL using a Littrow grating", report LA-UR-88-3655, LANL P.O. Box 1663 MS J579, Los Alamos N. Mex. 87545, to be published in the proceedings of the 10th annual FEL conference, Jerusalem, 1988), and the outcoupled beam is sampled throughout its full aperture. In FIG. 1, the resonator consists of a pair of grazing incidence convex beam expanders 21B and 21C, one at each end of the wiggler of oscillator section 3 and on axis, a pair of concave collimating reflectors 22B and 22C adjacent to the beam expanders 21B and 21C, and a grating rhomb consisting of the grating output coupler 5 and a first flat turning mirror 23A. The output coupled beam 8 is directed from the oscillator section 3 back to the input of the amplifier section 2 with a second flat turning mirror 23B.

Injection into the amplifier 2 is accomplished in a way similar to that for the oscillator 3. A pair of concave and convex mirrors 22A and 21A refocus the optical beam 8 to a waist near the center of the amplifier 2. The amplified output 7 is extracted by highly-reflective reflector 24 after the electron beam 1 has been deflected off axis of the optical beam. On its way to the amplifier injection optics, the optical beam 8 traverses a phase shifter 6 comprising a set of four reflectors by which the optical path length can be adjusted. The phase shifter 6 introduces an adjustable time delay in the optical path. The gross optical path length and the length of the phase shifter 6 are set by a delay control system 30 so that the pulse train outcoupled from the oscillator 3 overlaps with the appropriate pulse train of the electron beam 1 entering the amplifier 2. Specifically, for the single amplifier case illustrated in FIG. 1, only a single amplifier 2 is used, so a good configuration would allow half the micropulses originating in the accelerator 9 to interact in the oscillator 3, and the other half of the micropulses to interact with a delayed optical beam 8 in the amplifier 2. The delay control system 30 may have inputs monitoring the phase of the outcoupled beam 7, the optical beam 8 and the electron beam at the accelerator 9 and accelerator continuation 4 so that the delay of the optical pulses arriving at the amplifier 2 can be adjusted so that they overlap the desired electron pulses. The electron pulses which are not used thereupon pass through into the oscillator section 3 where they provide gain to sustain the existing pulse train in the oscillator section 3.

It is desirable to use every electron pulse in the laser. However, if a supplementary use is found for a subset of the oscillator pulses, this subset could be switched out of the optical beam in the path of beam 8 between the oscillator section 3 and the amplifier section 2, or between one of the amplifier sections 2A, 2B, 2C of FIG. 2.

FIG. 2 illustrates a laser 102 according to the invention sequence of amplifier sections 2A, 2B, 2C preceding the oscillator 3 in the path of the electron beam 1. In all other aspects, the structure is similar to that of FIG. 1. Again in the case of the second embodiment (FIG. 2), it is possible by adjusting one of the time delays using phase shifters such as phase shifter 6 under control of a delay control system 30 to cause the remaining oscillator pulses to overlap with the remaining electron pulses from the accelerator 9 so that every accelerator pulse is used once in the laser.

In proper operation, the oscillator 3 produces laser pulses on the $(n+1)^{st}$ subharmonic of the accelerator repetition rate, where n is the number of amplifiers in the system. If the accelerator 9 as the source of free electrons produces pulses more or less uniformly at a given repetition rate R, the oscillator produces optical pulses at the rate $R/(n+1)$. In this configuration, the oscillator is only using 1 pulse out of every $(n+1)$ consecutive pulses which pass through the oscillator. The pulses which the accelerator 9 produces can be divided into $n+1$ interleaved sets of pulse trains or particle sets, each operating at the $(n+1)^{st}$ subharmonic. In the present configuration, only one of these sets is used to supply gain in the oscillator. The other n sets are used to amplify the oscillator pulse train in the n amplifiers, respectively.

The oscillator pulse train is output coupled and fed back into the amplifier chain. An optical delay between the oscillator and the first amplifier is established by phase delay 6 so that the oscillator pulse train interacts with one of the alternative n sets of accelerator pulse trains. The optical delay between one amplifier section 2A and the next amplifier section 2B is established in a similar way. The optical pulse train which emerges from the previous amplifier 2A is delayed so that it interacts with one of the fresh pulse trains in the next amplifier 2B. By the time the optical beam has passed through the chain of amplifiers 2A, 2B, 2C, it has extracted energy from all of the independent sets of pulse trains produced by the accelerator except for one, which is the pulse train used in the oscillator 3 to sustain oscillation and thereby induce lasing. In this way, each electron micropulse produced in the accelerator is used only once, in either the oscillator or an amplifier.

The synchronized state is maintained by the effect of the FEL interaction on the electron beam. When an electron pulse is used to provide gain, its energy spread is increased. However, the gain which a pulse can supply decreases with the energy spread. As a result, if the same electron pulse is used to supply gain in two successive but identical FEL sections operated at the same optical wavelength, the gain produced in the second section will be lower than that of the first. This phenomenon sustains the synchronization of oscillator and amplifiers in the present configuration. When the system operates, the n pulse trains which have been used in the n amplifiers still pass through the oscillator section. However, since the energy spread of these n pulse trains is larger than that of the $(n+1)^{st}$ pulse train, they provide less gain. If the oscillator is configured so that the gain provided by the used pulse trains is below the oscillation threshold of the oscillator, only the unused $(n+1)^{st}$ pulse train produces oscillation.

As described above, the electron pulses which do overlap with the optical pulses in the amplifier 2 have their energy spread disturbed by the interaction. FIG. 4 shows schematically the effect of the interaction on the energy distribution of the electrons in a given micropulse. The input energy distribution A is narrow and is centered on the high-gain portion of the gain curve B, providing maximum gain to the optical beam 8. Once a pulse of electrons has traversed a gain region where there has been interaction with the optical beam 8, its energy distribution is greatly increased as shown in the perturbed distribution C in FIG. 4. The gain produced by the perturbed distribution C is therefore much reduced compared to the gain of the input distribution.

The cavity around the oscillator section 3 is arranged so that the electron pulse train which is perturbed in the amplifier 2 is below threshold when it passes through the oscillator 3. If the gain reduction produced by the overlap of the perturbed distribution C with the gain spectrum B is insufficient, then steps may be taken to drive the oscillator below threshold for these pulses. One alternative is to add dispersion in the electron transport system between the amplifier and the oscillator. Dispersion refers to the characteristic of an electron transport system which in a bend introduces a correlation between the transverse position and the energy of each electron.

The electron transport system between sections may contribute to additional gain reduction. If the electron transport system between the final amplifier section 2C and the oscillator section 3 is dispersive in its bends, the energy spread of the n used pulse trains can be made to result in a lengthening of their micropulses proportional to their energy spread. Since the gain in a free electron laser is proportional to the peak current, the effect of the dispersion is to further suppress the gain produced in the oscillator by the n used pulse trains compared to the one unused pulse train. If the energy spread effect alone is not enough to drive the oscillator below threshold on the n used pulse trains, the dispersion can be used for the remainder of the required gain suppression.

The effect of dispersion in the bending magnets is that electrons acquire a longitudinal displacement proportional to their energy. This effect is shown in FIGS. 5A, 5B and 5C. The distribution of electrons in phase space at the entrance to the oscillator section 3 is shown schematically by the ellipse D in FIG. 5A. The ellipse D encloses roughly 90% of the particles in the beam. In FIG. 5B, the energy spread of the beam is shown to be increased as in ellipse E, as would happen after gain was produced in an FEL section. If the beam in FIG. 5B is passed through a section with dispersion in the bends, the longitudinal position becomes correlated with the energy as shown in ellipse F in FIG. 5C. The length of the micropulse, which is given by the projection of the distribution onto the z axis, increases dramatically between ellipse E and ellipse F. This increase of the micropulse length reduces the gain available in the free electron laser since the gain is proportional to the peak current. The peak current is related to the charge in a micropulse divided by its bunch length.

There are other possible techniques for augmenting the gain difference between the group of electrons reserved for producing gain in the oscillator section 3 and the group of electrons which provided gain in one of the amplifier sections 2C. One of these techniques is to deflect the electron beam at the input to the oscillator section 3 so that the group of electrons reserved for the oscillator passes through with optimum filling factor while the used electrons are deflected, reducing their gain through the reduction in filling factor. This can be accomplished by time division multiplexing at the input of the oscillator section 3. An RF deflection system 31 may be provided in front of the oscillator section 3, as shown in FIG. 6. This deflection system 31 introduces an angle of propagation onto the beam which depends on time. As a result, different particles follow different trajectories X and Y after passing through the device, as shown in FIG. 6. By adjusting the frequency and timing of the RF drive 32 to the RF deflection system 31, the desired electrons can be directed along the axis X of the oscillator section 3 while the other electrons can be made to follow off-axis trajectories Y. The off-axis electrons produce a gain which is suppressed by the transverse dependence of the filling factor compared to the on-axis electrons. Although this approach has the disadvantage of requiring additional RF components, since the oscillator section is the last element in the FEL chain, precise control of the beam 1 after it emerges from the oscillator section 3 may no longer be necessary.

Under conditions for which the operation of the synchronized system is stable, the initial growth from noise into the synchronized state is automatic. Initially, no light is present in the oscillator, and approximately equal gain is present in each micropulse, no matter which pulse train it might come from. The oscillator output grows from noise, producing a substantially uniform pulse train at the repetition rate R of the accelerator. The oscillator according to the invention is set up so that it can provide a single pulse train at the repetition rate $R/(n+1)$. This means that its output at the repetition rate R is composed of $n+1$ independent pulse trains. However, the amplitudes of each of these independent pulse trains are always slightly different from each other, since they have grown up from the spontaneous noise of the resonator.

One of the pulse trains, herein the dominant train, is initially stronger than any of the others. According to the present configuration, in the n amplifiers this dominant pulse train overlaps with and increases the energy spread of the n electron pulse trains which give rise to the other n independent optical pulse trains in the oscillator. The dominant pulse train therefore reduces the gain of every other optical pulse train. The same is true of each of the weaker optical pulse trains, but their effect on the stronger pulse train is weaker than the effect of the strongest pulse train on them. In other words, each optical pulse train inhibits all of the other optical pulse trains. The pulse train which happens to start out as the strongest inhibits the others most strongly, eventually driving the other pulse trains below threshold in the oscillator, where they disappear.

In a PAMO configuration according to the invention, the laser oscillator automatically starts up on the $(n+1)^{st}$ subharmonic of the repetition rate of the accelerator. The other electrons are used to amplify the oscillator output in the n preceding amplifiers. There may be only a single amplifier, where in the simplest case every other electron micropulse is used in the amplifier.

While in many systems the gain in the oscillator will be driven below threshold with no additional effort, some high gain systems might benefit from the addition either a correlated energy and longitudinal position or from a time dependent transverse angle.

The delay control system 30 shown in FIG. 1 may be automatic, and may determine the delays which are required. This system is shown controlling the optical phase shifter unit 6 in FIG. 1, but it could equally well control the electron delay between the amplifier 2 and the oscillator 3, or both. The relevant inputs to the control system include the power and time structure of the laser at its output 7, and at intermediate points such as the output 8 of the oscillator. The power output is optimized at the best delay setting. If the delay is incorrect, the time structure of the output beam will also show growth of laser output between the desired output pulses. Since the delay is only one of the factors which controls the absence of such undesired pulses, a delay control system 30 for electron beam control should control the deflector 31 and the energy-longitudinal position correlated transport system. Additional parameters which are useful in monitoring these systems include the RF frequency, phase, and amplitude of both the accelerator 9 and the RF deflection system 31, the current at various positions in the FEL, the electron beam energy, and the energy spread and emittance which be changed as a result of the FEL interaction.

FIG. 3 shows the time structure of the pulse trains in the case for n=2. Time plot A of FIG. 3 shows the accelerator pulses at the repetition rate R. Every third pulse G is for a first amplifier 2A. Every third pulse H is for a second amplifier 2B. Every third pulse I is used by the oscillator section 3. Time plot B shows that the oscillator 3 has aligned itself to lase with a pulse set K synchronously with pulse set I, one of the three of pulse sets G, H, I, with a repetition rate of R/(n+1)=R/3. In this case, the adjustable delay unit 6 has been set so that the oscillator pulse set K overlaps in the first amplifier 2A with the pulse set G immediately following or to the right of its "own" electron pulse set I. Thus, the oscillating light is amplified by a succeeding pulse set.

The amplified light which emerges from the first amplifier 2A is refocused, delayed, and directed into the second amplifier 2B, where that light interacts with the next pulse set H, the last electron pulse set. The electron beam emerging from the first amplifier 2A is also extracted, delayed, refocused, and reinjected so that it propagates coaxially with the optical beam and so that its beam waist and position are optimized to give the optimum gain. The optical delay between the sequential amplifiers 2A and 2B is adjusted so that a fresh electron pulse set always interacts with the pulsed optical beam in each subsequent amplifier 2.

The delay of the optical pulses with respect to the electron pulses is accomplished primarily by setting the electron and the optical path lengths between adjacent amplifiers. A fine adjustment may be necessary. The fine adjustment can be made either in the optical beam path length or in the electron beam path length. No special equipment therefore is shown in FIG. 2 because it can be accomplished by tilting the convex mirrors 21 and by displacing transversely and tilting the concave mirrors 22. The fine delay adjustment can also be accomplished by adjusting the strength of the dipole magnets 12 which produce the dogleg trajectory between amplifiers 2. Additional fine adjustment options include inserting an additional four-reflection delay system such as phase delay system 6.

Alternative realizations of the multiple amplifier FEL can also be constructed based on these principles. For example, the oscillator 3 may be configured to operate on the 2(n+1)st subharmonic of the accelerator 9. In this case, two independent optical pulses will develop in the oscillator. If these pulses end up equally spaced, the situation is close to one previously described. However, the two pulses might be spaced by only one RF period of the accelerator, for example. The delays can be set to reflect this situation, and all the other electron pulses can still be used in the accelerator. If this is done, the condition is still established in which every optical pulse pair in the resonator inhibits every other optical pulse pair.

Many other temporal relationships can be designed, including cases with multiple independent oscillator pulses, and cases where every oscillator pulse inhibits only some of the other oscillator pulses.

Various embodiments of a PAMO free electron laser and methods for exciting and amplifying a free electron laser beam from a single accelerator have been shown and explained in accordance with the invention. Such a laser configuration is useful whenever an amplifier is required to supplement the capabilities of a single oscillator FEL. This occurs typically when high peak or average power is required, such as in many spectroscopic and other scientific uses of the FEL, and in industrial uses such as isotope separation, chemical synthesis, and materials processing.

The invention has now been explained with reference to specific embodiments. Other embodiments will be apparent to those of ordinary skill in the art. It is therefore not intended that the invention be limited except as indicated by the appended claims.

What is claimed is:

1. A laser having as an excitation source a source of charged low-mass particles, said laser comprising:

an optical amplifying means having an input disposed to receive said charged particles from said excitation source, said amplifying means comprising first means for producing a first spatially reciprocating magnetic field along a first optical section of an optical path of an optical beam and along a first particle section of a particle path of a particle beam where said first optical section and said first particle section overlap; and, an optical oscillator means disposed to receive said charged particles only through said amplifying means, said oscillator means comprising second means for producing a second spatially reciprocating magnetic field along a second optical section of said optical path and along a second particle section of said particle path where said second optical section and said second particle section overlap, said second spatially reciprocating magnetic field being of sufficient energy and said particle beam being of sufficient current density to produce gain above a threshold sufficient to induce lasing in said optical beam; and means for redirecting at least a portion of optical energy of said optical beam from said oscillator section to said input of said amplifying means.

2. The laser according to claim 1 wherein said excitation source includes means for producing a particle pulse train, said laser further comprising:

means for providing a time delay between said particle pulse train and an optical beam pulse train to cause temporal overlap between said particle pulse train and said optical beam pulse train to produce, (a) in said amplifying means, a first gain by first selected particle pulses in said optical beam; and, (b) in said oscillator means, a second gain above said threshold sufficient to induce lasing only by second selected particle pulses in said optical beam after said second selected particle pulses traverse said amplifying means.

3. The laser according to claim 2 wherein said time delay providing means comprises:

means for changing length of said particle path relative to said optical path such that (a) said first selected particle pulses causing amplification in said amplifier means align with pulses of an amplified optical beam, and such that (b) said second selected particle pulses causing oscillation in said oscillator means are not used for amplification and align only with oscillating optical pulses which produce an output of coherent optical radiation.

4. The laser according to claim 2 further including means between said first particle section and said second particle section for correlating energy deviation with longitudinal deviation of particles within each pulse in order to enhance gain difference between said first selected particle pulses and said second selected particle pulses sufficient to depress gain of said second selected particle pulses below said threshold.

5. The laser according to claim 2 further including means between said first particle section and said second particle section for deflecting said first selected particle pulses in order to enhance gain difference between said first selected particle pulses and said second selected particle pulses sufficient to depress gain of said second selected particle pulses below said threshold.

6. The laser according to claim 2 wherein said amplifying means comprises a cascade of amplifying systems and wherein said first selected particle pulses comprise a plurality of particle sets, each one of said particle sets being employed for amplification in only one of said amplifying systems.

7. The laser according to claim 1 wherein said amplifying means comprises a cascade of amplifying systems.

8. A method for producing coherent optical radiation using as an excitation source a source of charged low-mass particles, said method comprising:

producing a first group of said particles and a second group of said particles;

directing said first group through an optical amplifying means for interacting with photons in said amplifying means, said amplifying means having an input disposed to receive said charged particles from said excitation source;

producing in said amplifying means a first spatially reciprocating magnetic field along a first optical section of an optical path of an optical beam and along a first particle section of a particle path of a particle beam where said first optical section and said first particle section overlap to cause said first group in said first particle section to interact with photons in said first optical section;

directing said second group through said amplifying means without interacting with photons in said amplifying means and thereafter directing said second group through an optical oscillator means to interact with photons in said oscillator means, said oscillator means disposed to receive said charged particles only from said amplifying means;

producing in said oscillator means a second spatially reciprocating magnetic field along a second optical section of said optical path and along a second particle section of said particle path where said second optical section and said second particle section overlap to cause said second group in said second particle section to interact with photons in said second optical section, said second spatially reciprocating magnetic field being of sufficient energy and said particle beam being of sufficient current density to produce gain above a threshold sufficient to induce lasing in said optical beam; and redirecting at least a portion of optical energy of said optical beam from said oscillator section to said input of said amplifying section.

9. The method according to claim 8 wherein said first group and said second group comprise a particle pulse train, said method further comprising:

introducing a time delay between said particle pulse trains and an optical pulse train of said optical beam to cause temporal overlap between said particles and said optical beam to produce, in said amplifying means, gain by first selected particle pulses in said optical beam and to produce, in said oscillator means, gain above said threshold sufficient to induce lasing only by second selected particle pulses in said optical beam after said second selected particle pulses traverse said amplifying means.

10. The method according to claim 9 further comprising:

changing length of said particle path relative to said optical path so that the lengths of said paths are adjustable such that said first selected particle pulses causing amplification in said amplifying means align with pulses of an amplified optical beam and said second selected particle pulses causing oscillation in said oscillator means are not used for amplification in said amplifier means and align only with oscillating optical pulses which produce an output of coherent optical radiation.

11. The method according to claim 9 further comprising:

correlating energy deviation with longitudinal deviation of particles within each pulse in order to enhance gain difference between said first selected particle pulses and said second selected particle pulses sufficient to depress gain of said second selected particle pulses below said threshold.

12. The method according to claim 9 further comprising:

deflecting said first selected particle pulses between said first particle section and said second particle section in order to enhance gain difference between said first selected particle pulses and said second selected particle pulses sufficient to depress gain of said second selected particle pulses below said threshold.

13. The method according to claim 8 wherein said first group of particles comprises a plurality of particle sets, said method further comprising:

directing a first one of said particle sets through a first optical amplifying system of said optical amplifying means for interacting with photons in said first amplifying system, said first amplifying system having a first input disposed to receive all said charged particles from said source;

producing in said first amplifying system a first subsection of said first spatially reciprocating magnetic field along a first optical subsection of said optical path to cause said first one of said particle sets in a first particle subsection to interact with photons in said first optical subsection;

directing a next one of said particle sets through a next optical amplifying system of said optical amplifying means for interacting with photons in said next amplifying system, said next amplifying system having an input disposed to receive said charged particles from said first amplifying system; and producing in said next amplifying system a next subsection of said first spatially reciprocating magnetic field along a next optical subsection of said optical path to cause a next one of said particle sets in a next particle subsection to interact with photons in said next optical subsection.

* * * * *